United States Patent
Stone

(10) Patent No.: US 9,833,865 B2
(45) Date of Patent: Dec. 5, 2017

(54) RECONFIGURABLE FIXTURING SYSTEM AND METHOD

(71) Applicant: The Boeing Company, Chicago, IL (US)

(72) Inventor: Paul R. Stone, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 14/956,809

(22) Filed: Dec. 2, 2015

(65) Prior Publication Data

US 2017/0157725 A1 Jun. 8, 2017

(51) Int. Cl.
*B23Q 1/03* (2006.01)
*B23Q 1/48* (2006.01)
*B64F 5/00* (2017.01)

(52) U.S. Cl.
CPC ............ *B23Q 1/035* (2013.01); *B23Q 1/037* (2013.01); *B23Q 1/4866* (2013.01); *B64F 5/0009* (2013.01); *B64F 5/0081* (2013.01)

(58) Field of Classification Search
CPC . B23Q 1/03; B23Q 1/035; B23Q 1/25; B23Q 1/28; B23Q 3/00
See application file for complete search history.

(56) References Cited

U.S. PATENT DOCUMENTS

| | | | |
|---|---|---|---|
| 6,598,866 B2 * | 7/2003 | Helm | B23Q 1/032 269/21 |
| 6,625,866 B2 | 9/2003 | Stone et al. | |
| 6,817,933 B2 * | 11/2004 | Blick | B24B 41/068 269/21 |
| 7,584,947 B2 * | 9/2009 | Freeland | B23Q 1/035 269/21 |
| 8,695,958 B2 * | 4/2014 | Marrinan | B23Q 1/035 269/315 |
| 2006/0267262 A1 * | 11/2006 | Schiavi | B23Q 1/035 269/21 |
| 2009/0057971 A1 * | 3/2009 | Bumgarner | B23Q 1/035 269/21 |
| 2012/0049430 A1 * | 3/2012 | Aceti | B25B 11/007 269/21 |
| 2014/0353894 A1 * | 12/2014 | DesJardien | B23P 19/10 269/21 |
| 2017/0157725 A1 * | 6/2017 | Stone | B23Q 1/035 |

* cited by examiner

*Primary Examiner* — Lee D Wilson
(74) *Attorney, Agent, or Firm* — Walters & Wasylyna LLC

(57) ABSTRACT

A reconfigurable fixturing assembly including an elongate member defining a longitudinal axis, a support assembly slideably connected to the elongate member, the support assembly including a support member extending therefrom, a plurality of pivot assemblies slideably connected to the elongate member, each pivot assembly defining a pivot axis, and a plurality of transverse guide rails, wherein each transverse guide rail defines a guide rail axis that is transverse to the longitudinal axis of the elongate member, and wherein each transverse guide rail is slideably connected to an associated pivot assembly.

20 Claims, 8 Drawing Sheets

RECONFIGURABLE FIXTURING SYSTEM AND METHOD

FIELD

This application relates to workpiece fixturing and, more particularly, to reconfigurable fixturing systems and methods for supporting various workpieces in a manufacturing environment.

BACKGROUND

In various manufacturing environments, workpieces big and small are secured in fixtures prior to being processed (e.g., machined, drilled, sanded, welded, painted, etc.). However, fixturing large workpieces has proven to be particularly difficult and, thus, expensive due to the need for multiple precisely positioned contact points between the fixture and the workpiece, while preserving the ability for equipment and personnel to access the workpiece.

For example, aircraft, such as large commercial jetliners, are typically assembled from multiple large, separately-manufactured components (e.g., wings, empennage and multiple fuselage sections). During the manufacturing process, aircraft components must be rigidly supported to facilitate the various processes that must be performed to yield the finished component.

Traditionally, so-called "bed of nails" fixtures were used to support large, non-planar workpieces, such as aircraft wing skins. A typical "bed of nails" fixture includes multiple support posts positioned at various locations below the workpiece, thereby elevating the workpiece over the underlying floor. The support posts may linearly extend and retract (vertical movement) such that each support post contacts the workpiece at a contact point and elevates that contact point to the desired height. However, traditional "bed of nails" fixtures offer little or no horizontal movement of the support posts. Therefore, traditional "bed of nails" fixtures are not readily and efficiently reconfigurable to accommodate various different workpieces. When "bed of nails" fixtures are made to be reconfigurable, they have many unused support points (pogos). Traditional "bed of nails" fixtures are also composed of many support posts that are not used in any given setup due to the fact that the support posts used in one configuration cannot be used in other configurations.

Furthermore, some "bed of nails" fixtures allow for a bank of support posts to move along a linear guide or to move the entire bank along another axis. However, the reconfigurability is limited and does allow for rotation.

Accordingly, those skilled in the art continue with research and development efforts in the field of workpiece fixturing.

SUMMARY

In one embodiment, the disclosed reconfigurable fixturing assembly may include an elongate member defining a longitudinal axis, a support assembly slideably connected to the elongate member, the support assembly including a support member extending therefrom, a plurality of pivot assemblies slideably connected to the elongate member, each pivot assembly defining a pivot axis, and a plurality of transverse guide rails, wherein each transverse guide rail defines a guide rail axis that is transverse to the longitudinal axis of the elongate member, and wherein each transverse guide rail is slideably connected to an associated pivot assembly.

In another embodiment, the disclosed reconfigurable fixturing system may include a plurality of reconfigurable fixturing assemblies, wherein each reconfigurable fixturing assembly includes an elongate member defining a longitudinal axis, a support assembly slideably connected to the elongate member, the support assembly including a support member extending therefrom, a plurality of pivot assemblies slideably connected to the elongate member, each pivot assembly defining a pivot axis, and a plurality of transverse guide rails, wherein each transverse guide rail defines a guide rail axis that is transverse to the longitudinal axis of the elongate member, and wherein each transverse guide rail is slideably connected to an associated pivot assembly.

In yet another embodiment, disclosed is a method for fixturing a workpiece with a plurality of support assemblies, each support assembly including a support member, the method including (1) connecting the support assemblies to an elongate member such that each support assembly is slideable along a longitudinal axis of the elongate member; (2) connecting the elongate member to a plurality of transverse guide rails by way of a plurality of pivot assemblies, wherein each transverse guide rail defines a guide rail axis that is transverse to the longitudinal axis of the elongate member; (3) moving the elongate member relative to the transverse guide rails to a desired orientation within an x-y (e.g., horizontal) plane; (4) moving the support assemblies to desired positions along the elongate member; (5) optionally, adjusting a length of each support members; and (6) positioning the workpiece on the support members.

Other embodiments of the disclosed reconfigurable fixturing system and method will become apparent from the following detailed description, the accompanying drawings and the appended claims.

DETAILED DESCRIPTION

Disclosed is a reconfigurable fixturing system that includes one or more reconfigurable fixturing assemblies that may be moved to various orientations within an x-y (e.g., horizontal) plane to achieve a desired configuration. For example, the fixturing assembly may be rotated in the x-y plane. Those skilled in the art will appreciate that the ability to move a fixturing assembly in such a manner (e.g., rotation) may significantly reduce the number of support members (extending along the z axis) in a fixture, thereby significantly reducing cost.

Figure 1:
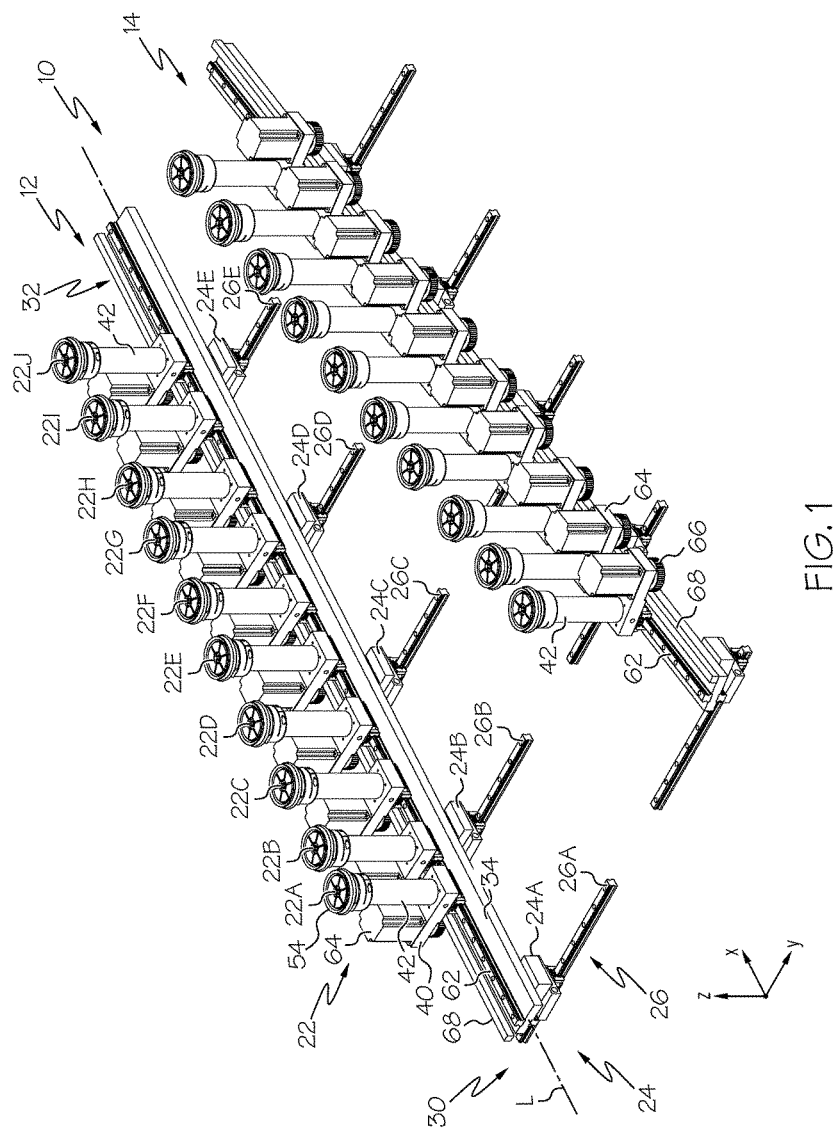
FIG. 1 is a perspective view of one embodiment of the disclosed reconfigurable fixturing system.
Figure 2:
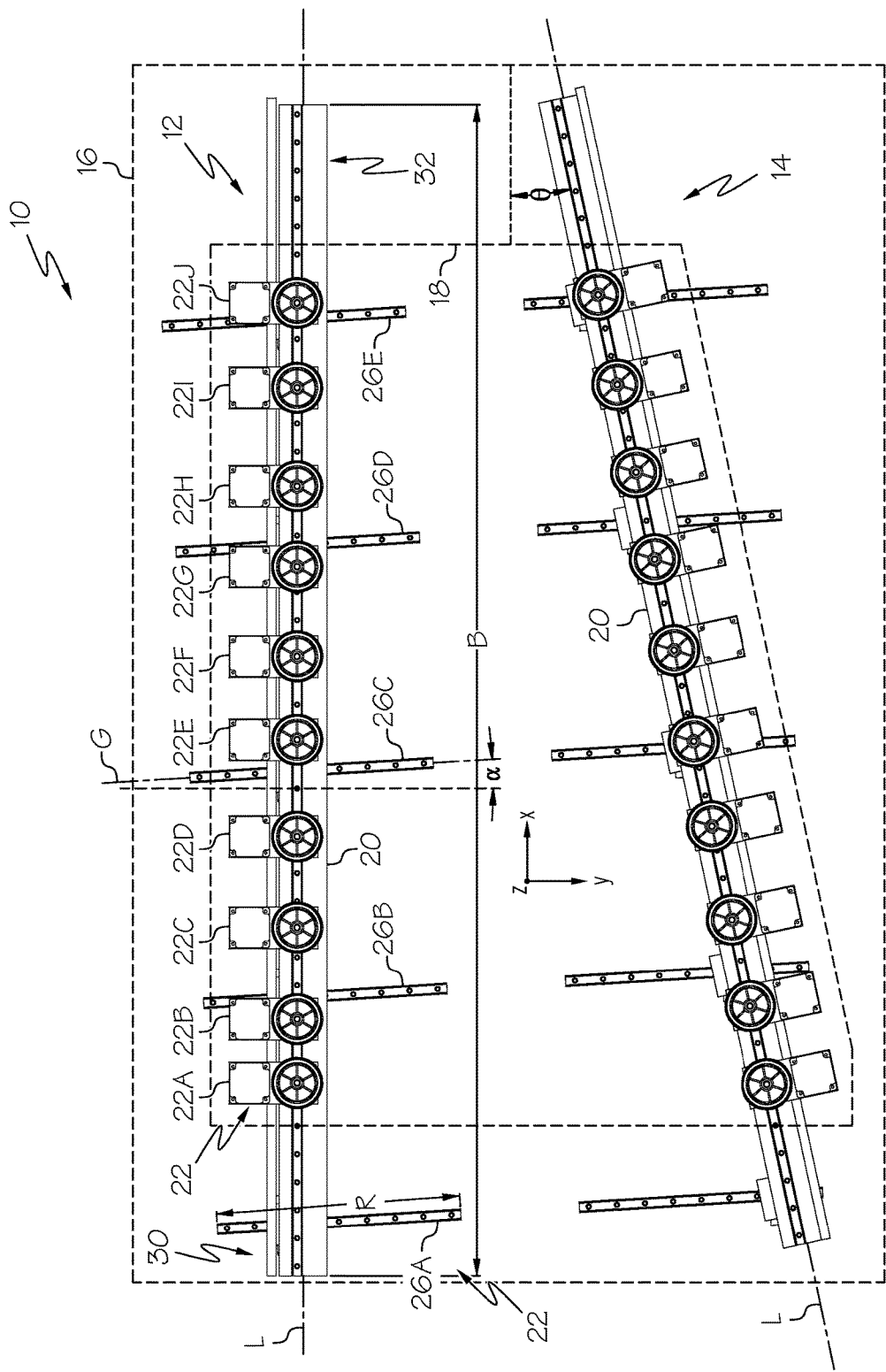
FIG. 2 is a top plan view of the reconfigurable fixturing system of FIG. 1.

Referring to FIGS. 1 and 2, one embodiment of the disclosed reconfigurable fixturing system, generally designated 10, may include a first reconfigurable fixturing assembly 12 and a second reconfigurable fixturing assembly 14. The first reconfigurable fixturing assembly 12 may be spaced apart from the second reconfigurable fixturing assembly 14 such that the first reconfigurable fixturing assembly 12 and the second reconfigurable fixturing assembly 14 define a workspace 16 (FIG. 2). A workpiece 18 (FIG. 2), such as an aircraft part or component, may be supported within the workspace 16 by the first reconfigurable fixturing assembly 12 and the second reconfigurable fixturing assembly 14 of the reconfigurable fixturing system 10.

While the reconfigurable fixturing system 10 is shown in FIGS. 1 and 2 with two reconfigurable fixturing assemblies 12, 14, in one variation, only one reconfigurable fixturing assembly (e.g., only reconfigurable fixturing assembly 12) may be included in the reconfigurable fixturing system 10. In another variation, three or more reconfigurable fixturing assemblies may be included in the reconfigurable fixturing system 10. Those skilled in the art will appreciate that the number of reconfigurable fixturing assemblies 12, 14 included in a particular reconfigurable fixturing system 10 may depend on the size of the workspace 16, which may depend on the size of the workpiece 18 to be supported by that reconfigurable fixturing system 10.

The reconfigurable fixturing assembly 12 will now be described in greater detail. The reconfigurable fixturing assembly 14 may be structured in the same (or similar) manner as the reconfigurable fixturing assembly 12. Therefore, the reconfigurable fixturing assembly 14 will not be separately discussed in detail.

Still referring to FIGS. 1 and 2, the reconfigurable fixturing assembly 12 may include a elongate member 20, one or more support assemblies 22A, 22B, 22C, 22D, 22E, 22F, 22G, 22H, 22I, 22J (collectively, support assemblies 22), a plurality of pivot assemblies 24A, 24B, 24C, 24D, 24E (collectively, pivot assemblies 24), and a plurality of transverse guide rails 26A, 26B, 26C, 26D, 26E (collectively, transverse guide rails 26). While the illustrated embodiment of the reconfigurable fixturing assembly 12 is shown with ten support assemblies 22, five pivot assemblies 24 and five transverse guide rails 26, the number of support assemblies 22, pivot assemblies 24 and transverse guide rails 26 included in a reconfigurable fixturing assembly may vary based on various factors (e.g., size/shape of the workpiece 18, length of the elongate member 20, etc.) without departing from the scope of the present disclosure.

The elongate member 20 of the reconfigurable fixturing assembly 12 may be elongated along a longitudinal axis L, and may include a first end portion 30 and a second end portion 32 longitudinally opposed from the first end portion 30. The elongate member 20 may include a first (e.g., upper) side 34 and an opposed second (e.g., under) side 36 (FIG. 3).

Figure 3:
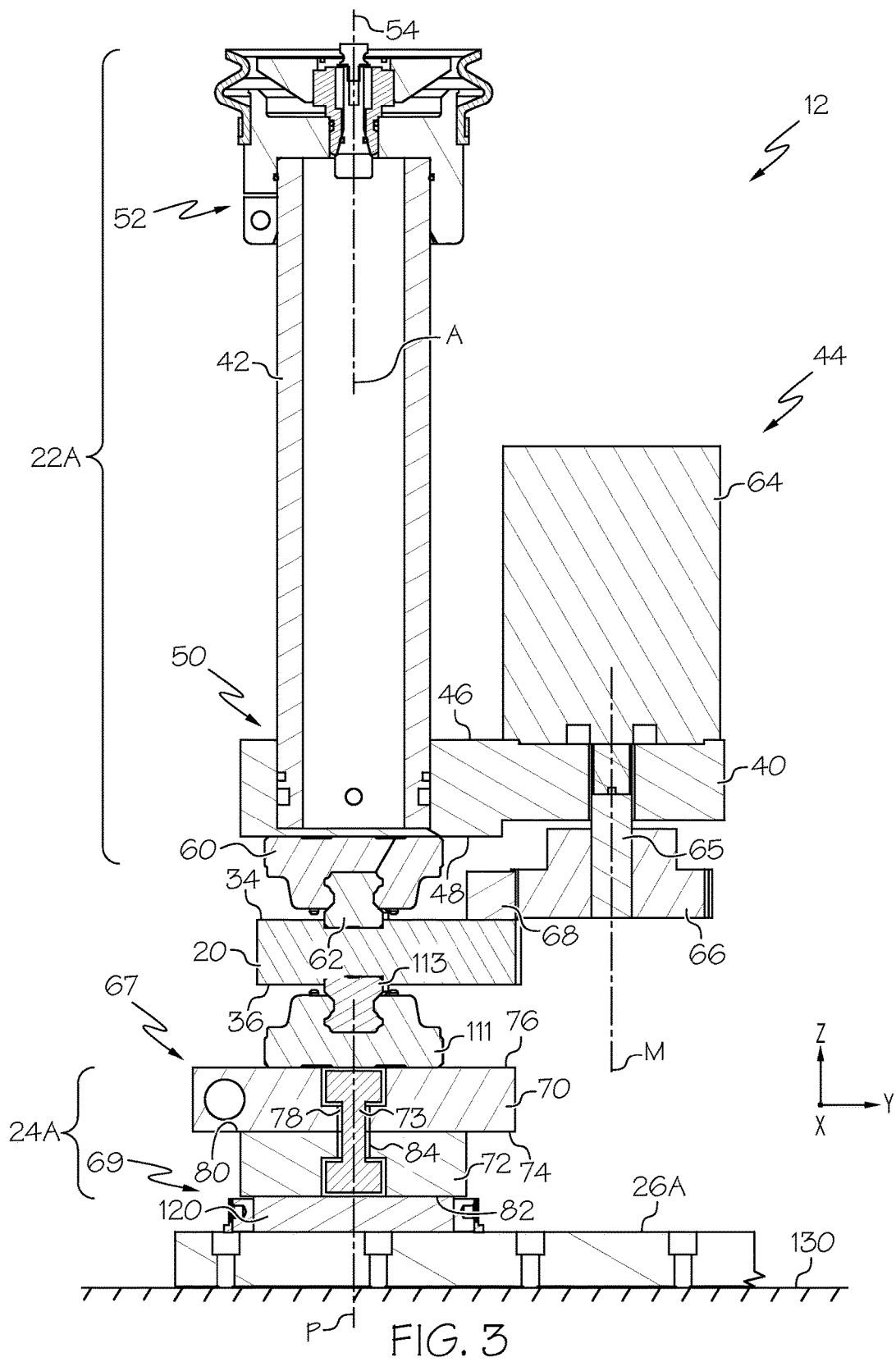
FIG. 3 is a longitudinal view of a portion of the reconfigurable fixturing system of FIG. 2.

As shown in FIG. 3, the elongate member 20 of the reconfigurable fixturing assembly 12 may be a beam (e.g., a metallic beam) or the like, and may have a generally rectangular and solid cross-sectional profile. However, elongate members 20 of various configurations may be suitable for supporting the support assemblies 22A, 22B, 22C, 22D, 22E, 22F, 22G, 22H, 22I, 22J in a manufacturing environment, and may be used without departing from the scope of the present disclosure. In one variation, the elongate member 20 may be an I-beam. In another variation, the elongate member 20 may have a hollow core to reduce the overall weight of the elongate member 20.

Referring back to FIGS. 1 and 2, the support assemblies 22A, 22B, 22C, 22D, 22E, 22F, 22G, 22H, 22I, 22J of the reconfigurable fixturing assembly 12 may be slideably connected to the elongate member 20. Therefore, each support assembly 22A, 22B, 22C, 22D, 22E, 22F, 22G, 22H, 22I, 22J may be connected to the elongate member 20, yet may be independently moveable relative to the elongate member 20 along the longitudinal axis L of the elongate member 20.

Figure 4:
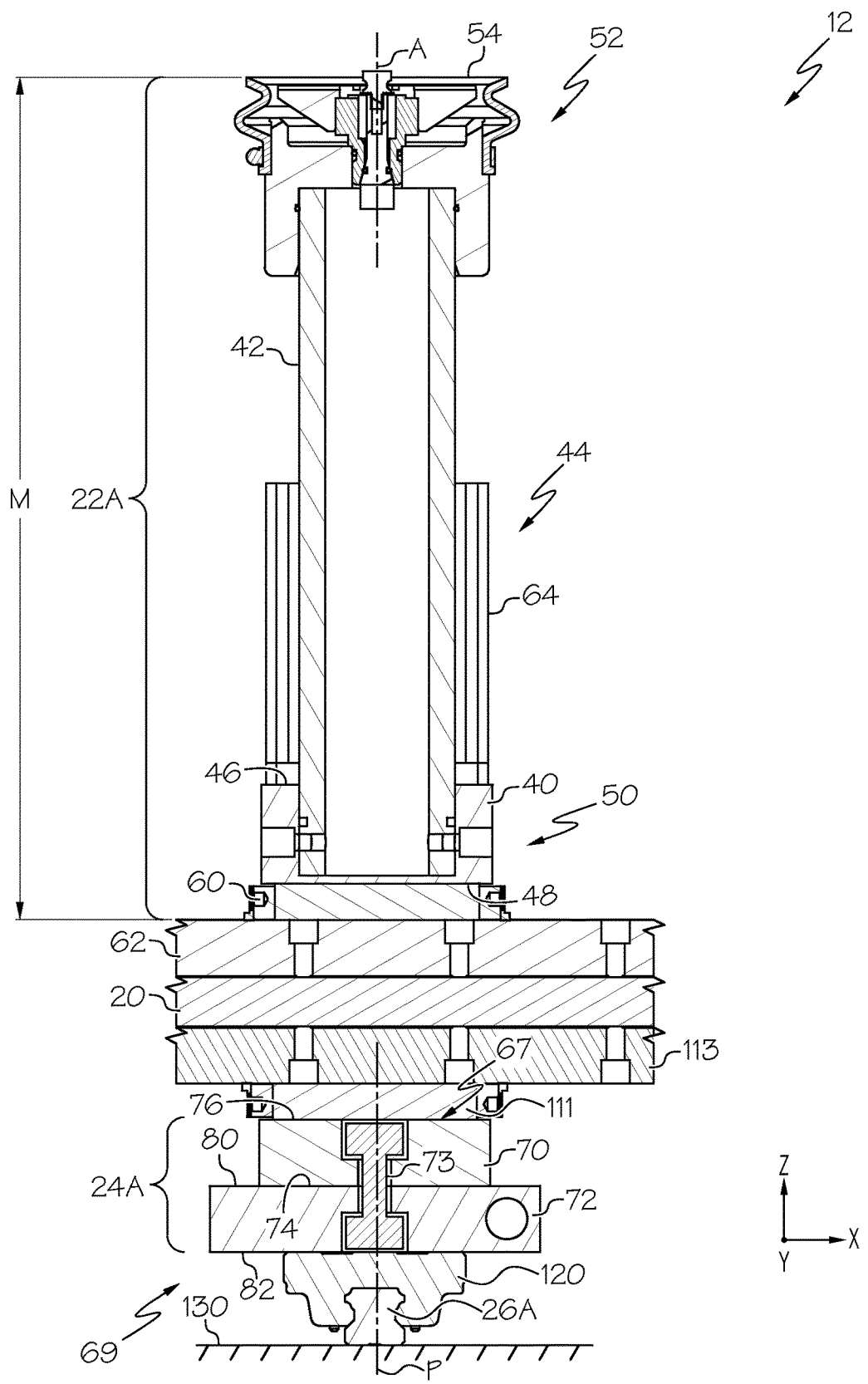
FIG. 4 is a lateral view of the portion of the reconfigurable fixturing system shown in FIG. 3.

Referring now to FIGS. 3 and 4, each support assembly 22A, 22B, 22C, 22D, 22E, 22F, 22G, 22H, 22I, 22J of the reconfigurable fixturing assembly 12 (only support assembly 22A is shown in FIGS. 3 and 4; the other support assemblies 22 may have the same or similar structure as support assembly 22A) may include a base 40, a support member 42 and a translation assembly 44. The base 40 may include a first (e.g., upper) side 46 and a second (e.g., under) side 48.

The support member 42 of the support assembly 22A may be elongated along a support member axis A, and may include a proximal end portion 50 and a distal end portion 52 opposed from the proximal end portion 50. The proximal end portion 50 of the support member 42 may be connected to the base 40. The distal end portion 52 of the support member 42 may protrude outward from the first side 46 of the base 40. As best shown in FIGS. 3 and 4, the support member axis A may be substantially parallel with the z axis, though non-parallel configurations are also contemplated.

The support member 42 of the support assembly 22A may have a length M (FIG. 4) along the support member axis A. In one aspect, the length M of the support member 42 may be fixed, as shown in FIGS. 3 and 4. Therefore, the z axis position of the distal end portion 52 of the support member 42 may be fixed, and may be dictated by the length M of the support member 42, among other factors.

In another aspect, the length M of the support member 42 of the support assembly 22A may be variable. As one example, the support member 42 may be moveable from a fully retracted position to a fully extended position (e.g., the support member 42 may be a passive extendable/retractable support member). As another example, the support member 42 may be moveable from a fully retracted position to a fully extended position, and various positions therebetween (e.g., the support member 42 may be an active extendable/retractable support member). Extension and retraction of the support member 42 may be effected using various apparatus/techniques, such as servos, linear actuators, ball screws, air cylinders and the like.

The distal end portion 52 of the support member 42 of the support assembly 22A may include a head 54 positioned to engage the workpiece 18 (FIG. 2). As one example, the head 54 may be a vacuum head, which may employ vacuum suction to engage and retain the workpiece 18 relative to the support member 42. As another example, the head 54 may be an indexing head, which may engage the workpiece 18, such as a recess (not shown) in the workpiece 18. Using a head 54 having another functionality is also contemplated, and will not result in a departure from the scope of the present disclosure.

As noted above, the support assembly 22A of the reconfigurable fixturing assembly 12 may be slideably connected to the elongate member 20 such that the support assembly 22A is moveable relative to the elongate member 20 along the longitudinal axis L (FIG. 1) of the elongate member 20. Various apparatus and techniques may be employed to achieve a sliding connection between the support assembly 22A and the elongate member 20, without departing from the scope of the present disclosure.

In one particular construction, the sliding connection between the support assembly 22A and the elongate member 20 may be effected with a first carriage 60 slideably engaged with a first longitudinal guide rail 62. For example, as best shown in FIG. 3, the first carriage 60 may be fixedly connected to the second side 48 of the base 40 of the support assembly 22A and the first longitudinal guide rail 62 may be fixedly connected to the first side 34 of the elongate member 20. In one alternative example, the first longitudinal guide rail 62 may be integral with the elongate member 20 (e.g., the first longitudinal guide rail 62 and the elongate member 20 may be formed as a single, monolithic body). In another alternative example, the first carriage 60 may be fixedly connected to the first side 34 of the elongate member 20 and the first longitudinal guide rail 62 may be fixedly connected to the second side 48 of the base 40 of the support assembly 22A. Optional friction reducing features (not shown), such as ball bearings, may be positioned between the first carriage 60 and the first longitudinal guide rail 62 (e.g., may be incorporated into the first carriage 60) to reduce friction as the support assembly 22A longitudinally moves along the elongate member 20.

The translation assembly 44 of the support assembly 22A may facilitate longitudinal movement of the support assembly 22A along the elongate member 20. Various translation assemblies may be employed to longitudinally move the support assembly 22A relative to the elongate member 20, without departing from the scope of the present disclosure.

As best shown in FIG. 3, in one particular construction, the translation assembly 44 of the support assembly 22A may include a motor 64 (e.g., an electric motor), a first gear 66 (e.g., a pinion) and a second gear 68 (e.g., a rack). The motor 64 may be mounted on the base 40 of the support assembly 22A, and may include a motor shaft 65 extending therefrom. The first gear 66 may be connected to, and coaxially aligned with, the motor shaft 65 such that actuation of the motor 64 causes corresponding rotation of the first gear 66 about the axis M (FIG. 3) of the motor shaft 65 in either a clockwise or counter-clockwise direction, as desired. The second gear 68 may be fixedly connected to the elongate member 20, such as to the first side 34 of the elongate member 20, and may extend from proximate the first end portion 30 of the elongate member 20 to proximate the second end portion 32 of the elongate member 20. The first gear 66 may be in meshed engagement with the second gear 68 such that rotation of the first gear 66 causes the support assembly 22A to longitudinally move along the elongate member 20.

Thus, each of the support assemblies 22A, 22B, 22C, 22D, 22E, 22F, 22G, 22H, 22I, 22J (FIG. 1) of the reconfigurable fixturing assembly 12 may be moveable to various longitudinal positions on the elongate member 20, thereby providing a degree of reconfigurability. The option to use support members 42 (FIG. 1) having a variable length M (FIG. 4) may provide a further degree of reconfigurability. The ability to move the elongate member 20 in the x-y (e.g., horizontal) plane along the transverse guide rails 26 (FIG. 1), as is described in greater detail below, provides a still further degree of reconfigurability.

Referring back to FIG. 1, the elongate member 20 of the reconfigurable fixturing assembly 12 may be slideably connected to the pivot assemblies 24A, 24B, 24C, 24D, 24E, and each pivot assembly 24A, 24B, 24C, 24D, 24E may be slideably connected to an associated transverse guide rail 26A, 26B, 26C, 26D, 26E. The sliding connection between the pivot assemblies 24A, 24B, 24C, 24D, 24E and the transverse guide rails 26A, 26B, 26C, 26D, 26E may facilitate lateral movement of the elongate member 20 (relative to the longitudinal axis L of the elongate member 20) along the transverse guide rails 26A, 26B, 26C, 26D, 26E, while the pivot assemblies 24A, 24B, 24C, 24D, 24E and the sliding connection between the elongate member 20 and the pivot assemblies 24A, 24B, 24C, 24D, 24E may facilitate articulating the elongate member 20 relative to the x axis to change the angle Θ (FIG. 2) between the x-axis and the longitudinal axis L of the elongate member 20.

Thus, the pivot assemblies 24A, 24B, 24C, 24D, 24E, the sliding connection between the elongate member 20 and the pivot assemblies 24A, 24B, 24C, 24D, 24E, and the sliding connection between the pivot assemblies 24A, 24B, 24C, 24D, 24E and the transverse guide rails 26A, 26B, 26C, 26D, 26E may facilitate moving the elongate member 20 to various positions within the x-y plane, including various orientations of the longitudinal axis L of the elongate member 20 vis-à-vis the x axis. For example, as best shown in FIG. 2, the reconfigurable fixturing system 10 may be configured such that the angle Θ between the x-axis and the longitudinal axis L of the elongate member 20 of the first reconfigurable fixturing assembly 12 is approximately zero, while the angle Θ between the x-axis and the longitudinal axis L of the elongate member 20 of the second reconfigurable fixturing assembly 14 is non-zero (e.g., about 15 degrees). Various other configurations are also possible.

Referring to FIG. 2, the reconfigurable fixturing assemblies 12, 14 of the disclosed reconfigurable fixturing system 10 may achieve various angles Θ between the x-axis and the longitudinal axes L of the elongate members 20. The maximum achievable angle Θ may depend on the longitudinal length B of the elongate member 20 and the length R of each transverse guide rail 26A, 26B, 26C, 26D, 26E, among other possible factors. In one expression, the angle Θ between the x-axis and the longitudinal axis L of the elongate member 20 may range from about −60 degrees to about +60 degrees. In another expression, the angle Θ between the x-axis and the longitudinal axis L of the elongate member 20 may range from about −45 degrees to about +45 degrees. In another expression, the angle Θ between the x-axis and the longitudinal axis L of the elongate member 20 may range from about −30 degrees to about +30 degrees. In yet another expression, the angle Θ between the x-axis and the longitudinal axis L of the elongate member 20 may range from about −20 degrees to about +20 degrees. At this point, those skilled in the art will appreciate that without the pivot assemblies 24A, 24B, 24C, 24D, 24E, the angle Θ may be fixed.

Referring back to FIGS. 3 and 4, each pivot assembly 24A, 24B, 24C, 24D, 24E of the reconfigurable fixturing assembly 12 (only pivot assembly 24A is shown in FIGS. 3 and 4) may include a first side 67 slideably connected to the elongate member 20 and an opposed second side 69 slideably connected to an associated transverse guide rail 26A, 26B, 26C, 26D, 26E (only transverse guide rail 26A is shown in FIGS. 3 and 4). Therefore, each pivot assembly 24A may facilitate pivoting of the elongate member 20 relative to the associated transverse guide rail 26A about a pivot axis P, which may be orthogonal to the longitudinal axis L. Various structures and features may be employed to facilitate pivoting of the elongate member 20 relative to the transverse guide rails 26A, 26B, 26C, 26D, 26E, without departing from the scope of the present disclosure.

In one implementation, each pivot assembly 24A, 24B, 24C, 24D, 24E of the reconfigurable fixturing assembly 12 (only pivot assembly 24A is shown in FIGS. 3 and 4) may include a first plate member 70, a second plate member 72 and a pin 73. The first plate member 70 may include a first engagement surface 74, a first connection surface 76 opposed from the first engagement surface 74, and a first bore 78 extending inward from the first engagement surface 74. The second plate member 72 may include a second engagement surface 80, a second connection surface 82 opposed from the second engagement surface 80, and a second bore 84 extending inward from the second engagement surface 80. The first engagement surface 74 of the first plate member 70 may be positioned in abutting engagement with the second engagement surface 80 of the second plate member 72 such that the first bore 78 of the first plate member 70 is aligned with the second bore 84 of the second plate member 72. The pin 73 may extend through the first bore 78 and the second bore 84, thereby preventing displacement (in the x-y plane) of the first plate member 70 relative to the second plate member 72, while permitting the first plate member 70 to rotate about the pivot axis P relative to the second plate member 72.

At this point, those skilled in the art will appreciate that friction between the first engagement surface 74 of the first plate member 70 and the second engagement surface 80 of the second plate member 72 may inhibit pivoting rotation of the first plate member 70 relative to the second plate member 72 about the pivot axis P. However, various steps may be taken to reduce friction between the first and second engagement surfaces 74, 80. As one non-limiting example, the first and second plate members 70, 72 may be constructed from low-friction materials. As another non-limiting example, the first and second plate members 70, 72 may be formed from a metal or metal alloys, and the first and second engagement surfaces 74, 80 may be polished to reduce friction.

Figure 5A:
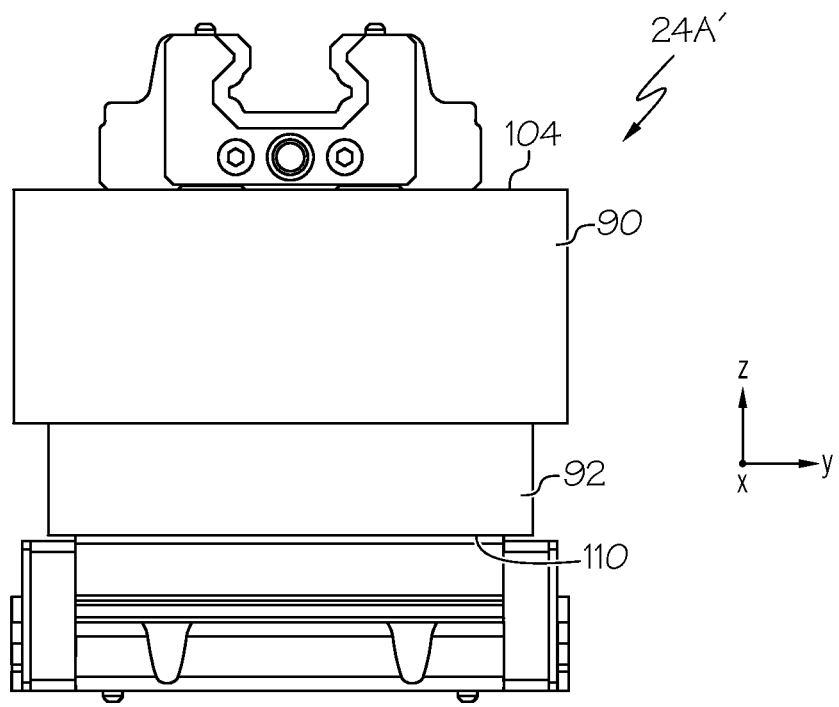
FIG. 5A is a longitudinal elevational view of one alternative pivot assembly that may be used in the portion of the reconfigurable fixturing system shown in FIG. 3.
Figure 5B:
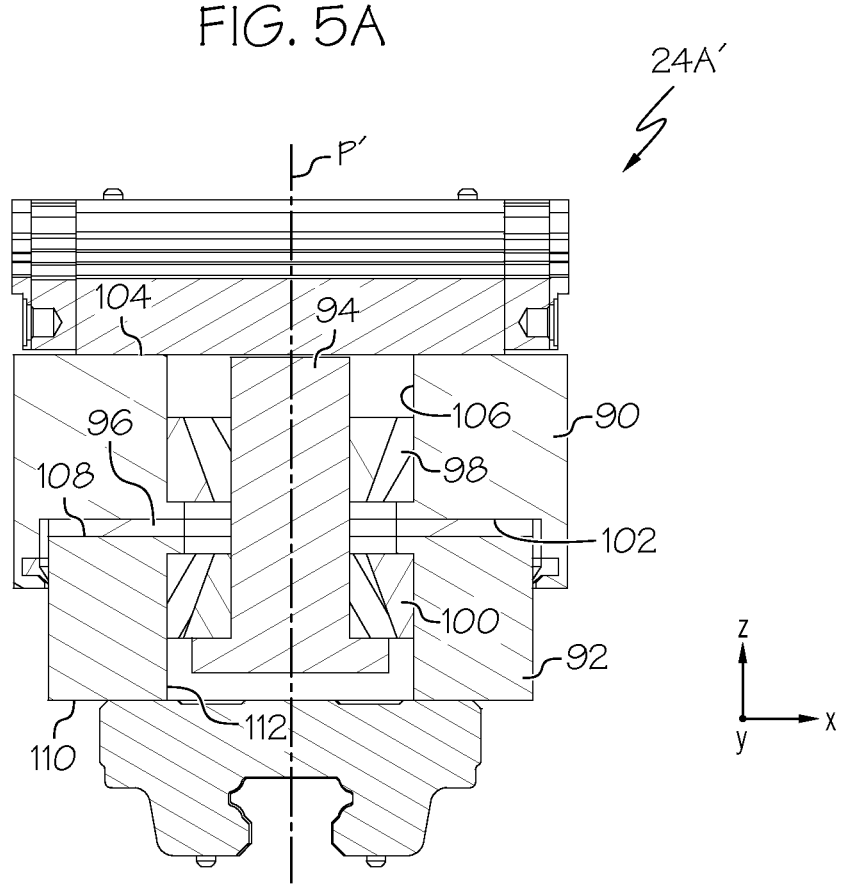
FIG. 5B is a lateral cross-sectional view of the alternative pivot assembly shown in FIG. 5A.

Referring to FIGS. 5A and 5B, in one alternative implementation, a pivot assembly 24A' may include a first member 90, a second member 92, a pin 94 (FIG. 5B), a thrust bearing 96 (FIG. 5B), a first taper bearing 98 (FIG. 5B) and a second taper bearing 100 (FIG. 5B). The first member 90 may include a first engagement surface 102 (FIG. 5B), a first connection surface 104 opposed from the first engagement surface 102, and a first bore 106 (FIG. 5B) extending inward from the first engagement surface 102. The second member 92 may include a second engagement surface 108 (FIG. 5B), a second connection surface 110 opposed from the second engagement surface 108, and a second bore 112 (FIG. 5B) extending inward from the second engagement surface 108. The pin 94 may extend through the first bore 106 and the second bore 112. The first taper bearing 98 may be positioned in the first bore 106 between the pin 94 and the first member 90, and the second taper bearing 100 may be positioned in the second bore 112 between the pin 94 and the second member 92. Therefore, the pin 94 may prevent displacement (in the x-y plane) of the first member 90 relative to the second member 92, while permitting the first member 90 to rotate about the pivot axis P relative to the second member 92. The thrust bearing 96 may be positioned between the first engagement surface 102 of the first member 90 and the second engagement surface 108 of the second member 92 to reduce friction therebetween as the first member 90 rotates relative to the second member 92 about the pivot axis P'.

Referring back to FIGS. 3 and 4, each pivot assembly 24A, 24B, 24C, 24D, 24E of the reconfigurable fixturing assembly 12 (only pivot assembly 24A is shown in FIGS. 3 and 4) may be slideably connected to the elongate member 20 such that the pivot assembly 24A is moveable relative to the elongate member 20 along the longitudinal axis L (FIG. 1) of the elongate member 20. Various apparatus and techniques may be employed to achieve a sliding connection between the pivot assembly 24A and the elongate member 20, without departing from the scope of the present disclosure.

In one particular construction, the sliding connection between the pivot assembly 24A and the elongate member 20 may be effected with a second carriage 111 slideably engaged with a second longitudinal guide rail 113. For example, as best shown in FIG. 3, the second carriage 111 may be fixedly connected to the first connection surface 76 of the first plate member 70 of the pivot assembly 24A and the second longitudinal guide rail 113 may be fixedly connected to the second side 36 of the elongate member 20. In one alternative example, the second longitudinal guide rail 113 may be integral with the elongate member 20 (e.g., the second longitudinal guide rail 113 and the elongate member 20 may be formed as a single, monolithic body). In another alternative example, the second carriage 111 may be fixedly connected to the second side 36 of the elongate member 20 and the second longitudinal guide rail 113 may be fixedly connected to the first connection surface 76 of the first plate member 70 of the pivot assembly 24A. Optional friction reducing features (not shown), such as ball bearings, may be positioned between the second carriage 111 and the second longitudinal guide rail 113 (e.g., may be incorporated into the second carriage 111) to reduce friction as the pivot assembly 24A longitudinally moves relative to the elongate member 20.

Each pivot assembly 24A, 24B, 24C, 24D, 24E (FIG. 1) of the reconfigurable fixturing assembly 12 (only pivot assembly 24A is shown in FIGS. 3 and 4) may also be slideably connected to an associated transverse guide rail 26A, 26B, 26C, 26D, 26E (only transverse guide rail 26A is shown in FIGS. 3 and 4). Various apparatus and techniques may be employed to achieve a sliding connection between the pivot assembly 24A and the transverse guide rail 26A, without departing from the scope of the present disclosure.

In one particular construction, the sliding connection between the pivot assembly 24A and the transverse guide rail 26A may be effected with a third carriage 120 slideably engaged with the transverse guide rail 26A. For example, as best shown in FIG. 4, the third carriage 120 may be fixedly connected to the second connection surface 82 of the second plate member 72 of the pivot assembly 24A and the transverse guide rail 26A may be fixedly connected to a substrate 130 (e.g., the floor of a manufacturing facility). Optional friction reducing features (not shown), such as ball bearings, may be positioned between the third carriage 120 and the transverse guide rail 26A (e.g., may be incorporated into the third carriage 120) to reduce friction as the pivot assembly 24A and supported elongate member 20 move along the transverse guide rail 26A.

Referring back to FIG. 2, each transverse guide rail 26A, 26B, 26C, 26D, 26E may extend along a guide rail axis G (see transverse guide rail 26C). The guide rail axis G of each transverse guide rail 26A, 26B, 26C, 26D, 26E may be transverse to the longitudinal axis L of the associated elongate member 20.

In one realization, the guide rail axis G of each transverse guide rail 26A, 26B, 26C, 26D, 26E may be substantially parallel with the guide rail axes G of the other transverse guide rails 26A, 26B, 26C, 26D, 26E. As one example, the guide rail axis G of each transverse guide rail 26A, 26B, 26C, 26D, 26E may be aligned with the y axis. As another example, the guide rail axis G of each transverse guide rail 26A, 26B, 26C, 26D, 26E may be disposed at an angle α relative to the y axis, and the angle α may be non-zero. For example, the angle α may range from about 1 degree to about 60 degrees, such as from about 5 degrees to about 45 degrees, or from about 10 degrees to about 30 degrees.

In another realization, the guide rail axis G of one or more transverse guide rails 26A, 26B, 26C, 26D, 26E may intersect the guide rail axis G of one or more other transverse guide rails 26A, 26B, 26C, 26D, 26E. Therefore, the angle α between the y axis and the guide rail axis G of one transverse guide rail 26A, 26B, 26C, 26D, 26E may be different from the angle α between the y axis and the guide rail axis G of another transverse guide rail 26A, 26B, 26C, 26D, 26E.

Figure 6:
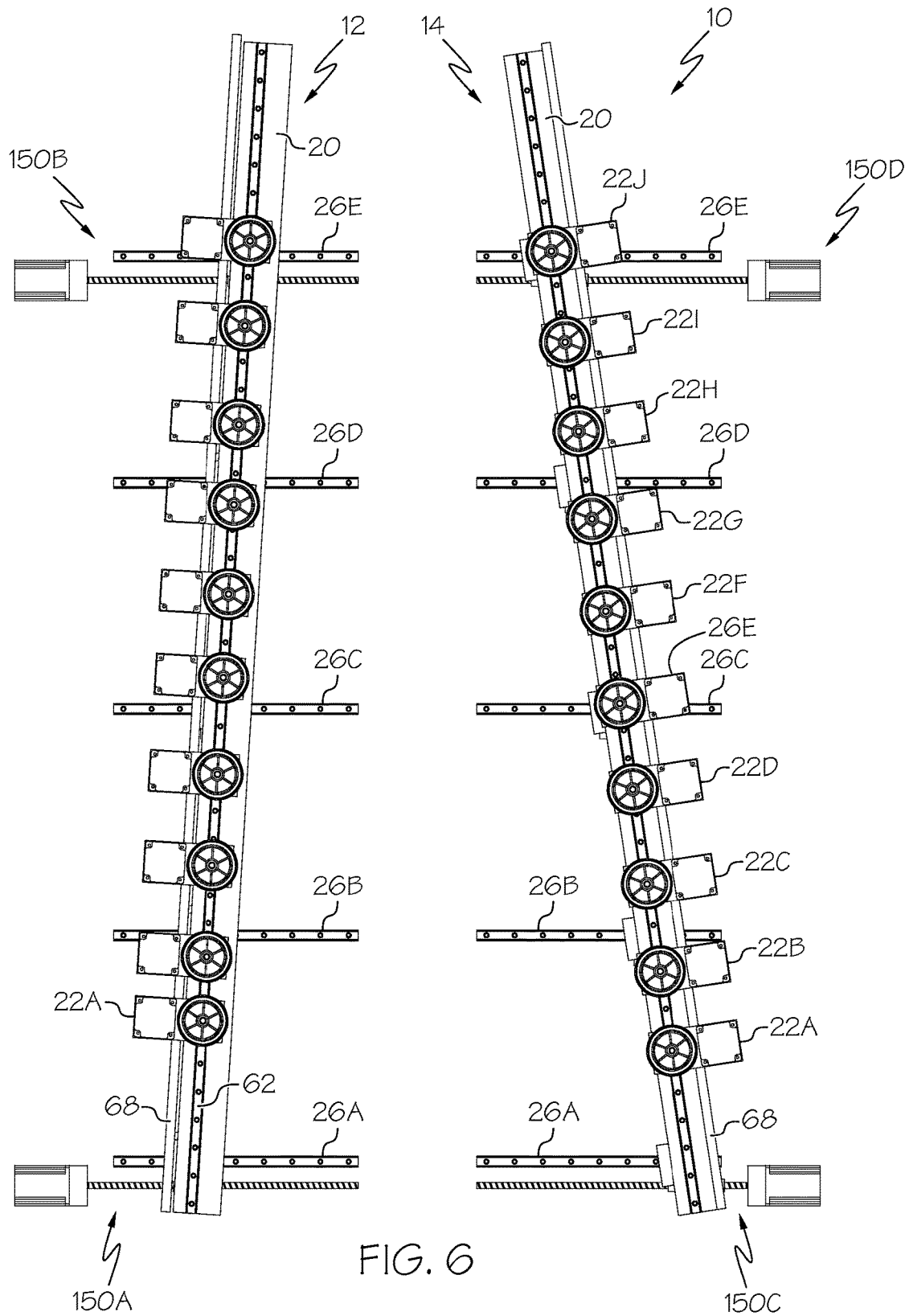
FIG. 6 is a top plan view of a reconfigurable fixturing system employing ball-screw assemblies for effecting movement in an x-y plane.
Figure 7:
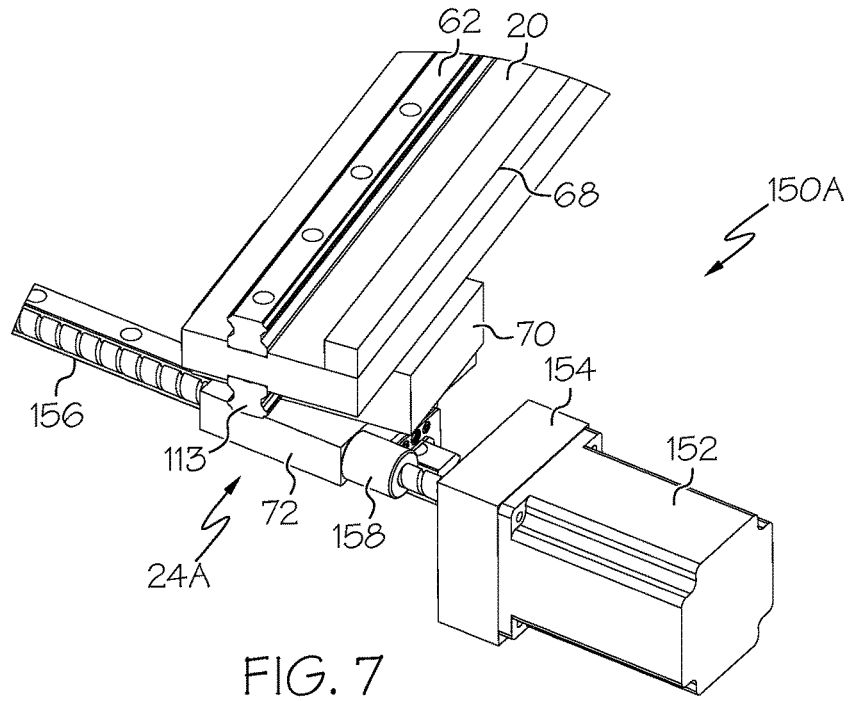
FIG. 7 is a perspective view of a ball-screw assembly of the reconfigurable fixturing system of FIG. 6.

Movement of the elongate member 20 (and associated support assemblies 22A, 22B, 22C, 22D, 22E, 22F, 22G, 22H, 22I, 22J) relative to the transverse guide rails 26A, 26B, 26C, 26D, 26E may be effected using various techniques. Referring to FIG. 6, as one specific non-limiting example, movement of elongate members 20 (and associated support assemblies 22A, 22B, 22C, 22D, 22E, 22F, 22G, 22H, 22I, 22J) relative to the transverse guide rails 26A, 26B, 26C, 26D, 26E may be effected with ball-screw assemblies 150A, 150B, 150C, 150D. As shown in FIG. 7, each ball-screw assembly 150A, 150B, 150C, 150D (only ball-screw assembly 150A is shown in FIG. 7) may include a motor 152, a motor mount 154, a screw 156 and a nut 158. The nut 158 may be connected to (or integral with) the second plate member 72 of the pivot assembly 24A. The screw 156 may be in threaded engagement with the nut 158. The motor 152 may be operably connected to the screw 156 to cause rotation (clockwise and counterclockwise, as desired) of the screw 156. The motor mount 154 may hold the motor 152 (and associated screw 156) in a fixed position. Therefore, as the motor 152 causes the screw 156 to rotate, the rotation of the screw 156 causes the nut 158 and, thus, the pivot assembly 24A to longitudinally move along the screw 156, thereby causing the pivot assembly 24A to move along the associated transverse guide rail 26A. Rotation of reconfigurable fixturing assembly 12 may be achieved by moving the nut 158 of ball-screw assemblies 150A, 150B to different locations. Examples of other techniques for effecting movement of the elongate members 20 (and associated support assemblies 22A, 22B, 22C, 22D, 22E, 22F, 22G, 22H, 22I, 22J) relative to the transverse guide rails 26A, 26B, 26C, 26D, 26E include, but are not limited to, rack and pinion gears and air cylinders.

Accordingly, the elongate member 20 of each reconfigurable fixturing assembly 12, 14 of the disclosed reconfigurable fixturing system 10 may be moved to various positions and orientations within the x-y plane, thereby enabling a user to position the support assemblies 22A, 22B, 22C, 22D, 22E, 22F, 22G, 22H, 22I, 22J supported by the elongate members 20 at various locations within the x-y plane. The support assemblies 22A, 22B, 22C, 22D, 22E, 22F, 22G, 22H, 22I, 22J may optionally include support members 42 that are extendable/retractable along the z axis (e.g., vertically). Therefore, the disclosed reconfigurable fixturing system 10 provides a substantial degree of reconfigurability.

Figure 8:
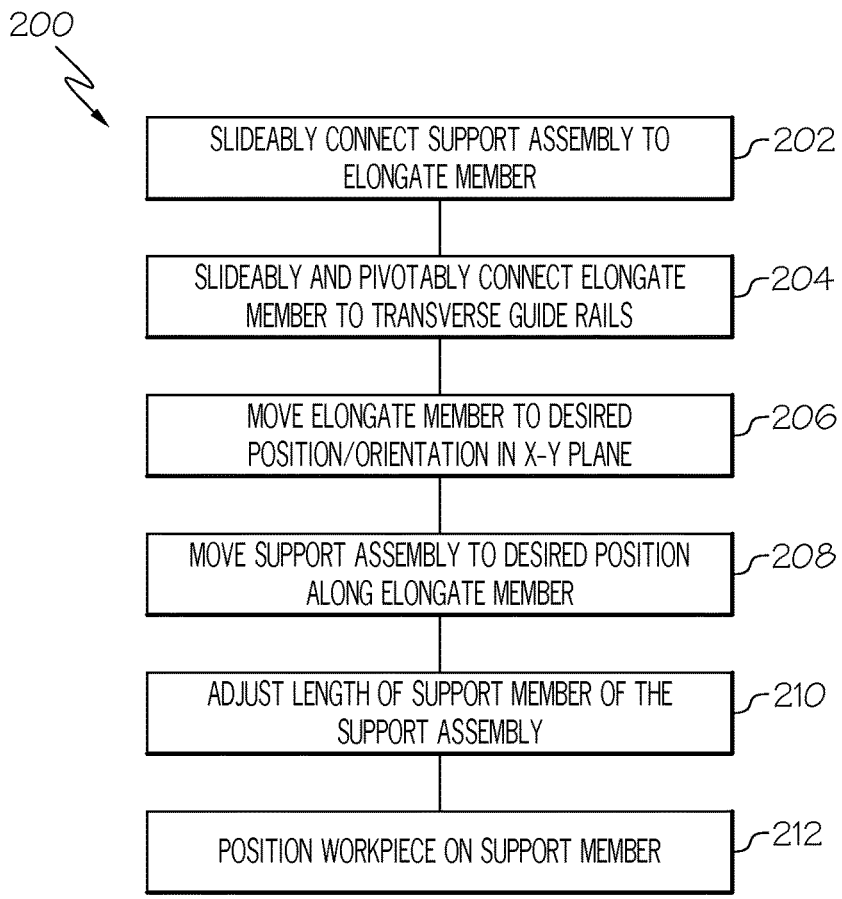
FIG. 8 is a flow diagram of one embodiment of the disclosed method for fixturing a workpiece.

Also disclosed is a method for fixturing a workpiece 18 (FIG. 2). Referring to FIG. 8, one embodiment of the disclosed method for fixturing a workpiece 18, generally designated 400, may begin at block 402 with the step of connecting one or more support assemblies 22 to an elongate member 20 such that each support assembly 22 is slideable along a longitudinal axis L of the elongate member 20.

At block 404, the elongate member 20 may be connected to a plurality of transverse guide rails 26 by way of a plurality of pivot assemblies 24. Each transverse guide rail 26 may define a guide rail axis G that is transverse to the longitudinal axis L of the elongate member 20.

At block 406, the elongate member 20 may be moved relative to the transverse guide rails 26 to a desired orientation within an x-y plane. The movement may occur by sliding the elongate member 20 along the transverse guide rails 26 while allowing the elongate member 20 to pivot relative to the transverse guide rails 26 at the pivot assemblies 24.

At block 408, the support assemblies 22 may be moved to desired positions along the elongate member 20. For example, the translation assembly 44 of each support assembly 22 may be actuated to move the support assemblies 22 to the desired longitudinal location along the elongate member 20.

At block 410, the length M of each support member 42 of the support assemblies 22 may optionally be adjusted, such as by extending or retracting the support member 42, thereby adjusting the position of the distal end portion 52 of each support member 42 along the z axis. Of course, the adjusting step of block 410 may only be performed if the support members 42 are variable length support members.

At block 412, a workpiece 18 may be positioned on the support members 42 of the support assemblies 22. The support members 42 may engage the workpiece 18 at the desired location on the workpiece 18, thereby fixing the workpiece 18 in the desired orientation and position in space.

Figure 9:
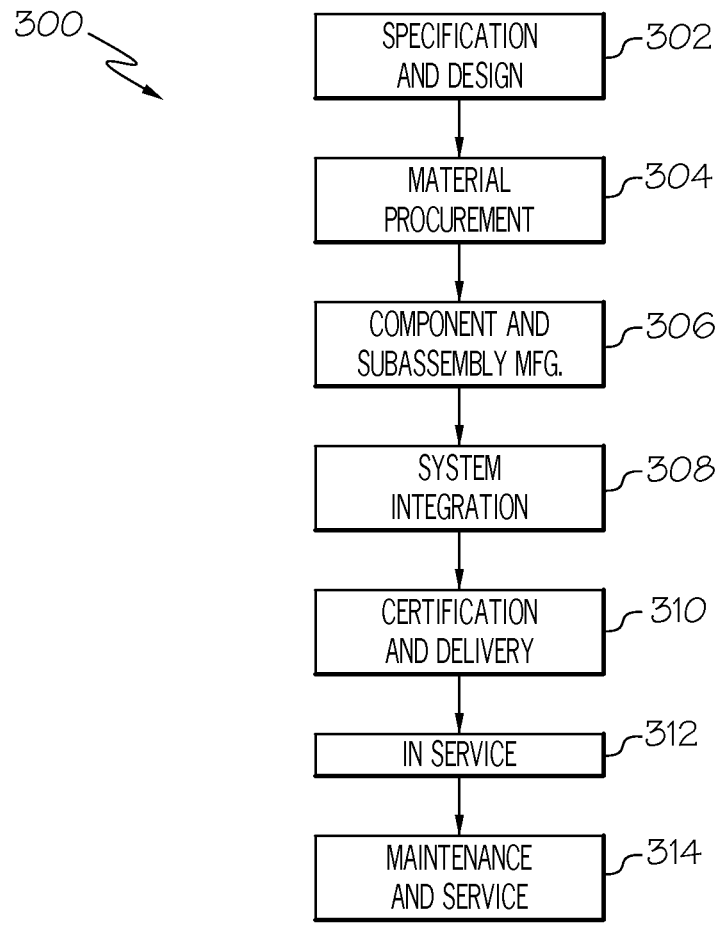
FIG. 9 is a flow diagram of an aircraft manufacturing and service methodology.
Figure 10:
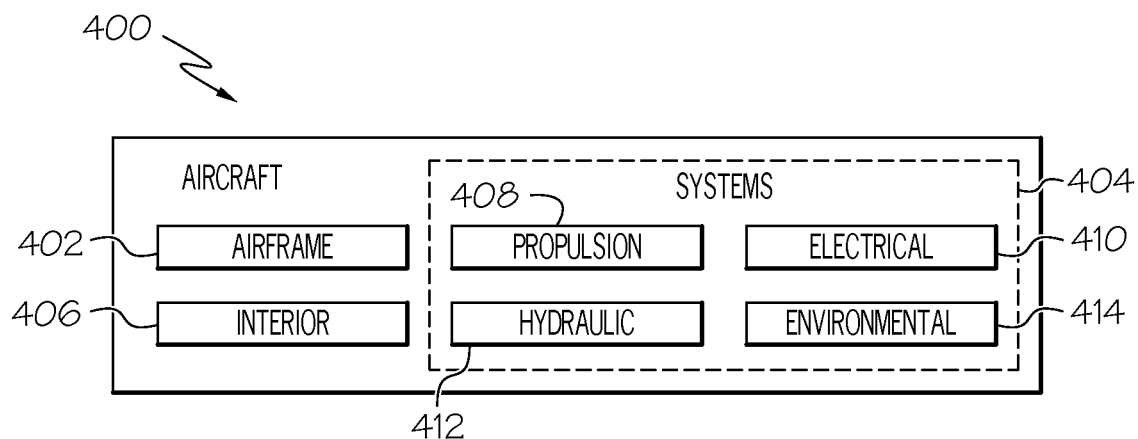
FIG. 10 is a block diagram of an aircraft.

Examples of the present disclosure may be described in the context of an aircraft manufacturing and service method 300 as shown in FIG. 9 and an aircraft 400 as shown in FIG. 10. During pre-production, the illustrative method 300 may include specification and design, as shown at block 302, of the aircraft 400 and material procurement, as shown at block 304. During production, component and subassembly manufacturing, as shown at block 306, and system integration, as shown at block 308, of the aircraft 400 may take place. Thereafter, the aircraft 400 may go through certification and delivery, as shown block 310, to be placed in service, as shown at block 312. While in service, the aircraft 400 may be scheduled for routine maintenance and service, as shown at block 314. Routine maintenance and service may include modification, reconfiguration, refurbishment, etc. of one or more systems of the aircraft 400.

Each of the processes of illustrative method 300 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 400 produced by illustrative method 300 (FIG. 9) may include airframe 402 with a plurality of high-level systems 404 and interior 406. Examples of high-level systems 404 may include one or more of propulsion system 408, electrical system 410, hydraulic system 412, and environmental system 814. Any number of other systems may be included. Although an aerospace example is shown, the principles disclosed herein may be applied to other industries, such as the automotive and marine industries. Accordingly, in addition to the aircraft 400, the principles disclosed herein may apply to other vehicles (e.g., land vehicles, marine vehicles, space vehicles, etc.).

The disclosed reconfigurable fixturing system and method may be employed during any one or more of the stages of the manufacturing and service method 300. For example, components or subassemblies corresponding to component and subassembly manufacturing (block 306) may be fabricated or manufactured using the disclosed reconfigurable fixturing system and method. Also, the disclosed reconfigurable fixturing system and method may be utilized during production stages (blocks 306 and 308), for example, by substantially expediting assembly of or reducing the cost of aircraft 400. Similarly, the disclosed reconfigurable fixturing system and method may be utilized, for example and without limitation, while aircraft 400 is in service (block 312) and/or during the maintenance and service stage (block 314).

Although various embodiments of the disclosed reconfigurable fixturing system and method have been shown and described, modifications may occur to those skilled in the art upon reading the specification. The present application includes such modifications and is limited only by the scope of the claims.

What is claimed is:

1. A reconfigurable fixturing assembly comprising:
    an elongate member defining a longitudinal axis;
    a support assembly slideably connected to said elongate member, said support assembly comprising a support member extending therefrom;
    a plurality of pivot assemblies slideably connected to said elongate member, each pivot assembly of said plurality of pivot assemblies defining a pivot axis; and
    a plurality of transverse guide rails, wherein each transverse guide rail of said plurality of transverse guide rails defines a guide rail axis that is transverse to said longitudinal axis, and wherein each transverse guide rail of said plurality of transverse guide rails is slideably connected to an associated pivot assembly of said plurality of pivot assemblies.

2. The reconfigurable fixturing assembly of claim 1 wherein said elongate member comprises a first side and an opposed second side, and wherein said support assembly is slideably connected to said first side and said plurality of pivot assemblies are slideably connected to said second side.

3. The reconfigurable fixturing assembly of claim 1 wherein said sliding connection between said elongate member and said support assembly is effected by a carriage slideably engaged with a guide rail.

4. The reconfigurable fixturing assembly of claim 3 wherein said carriage is fixedly connected to said support assembly and said guide rail is fixedly connected to said elongate member.

5. The reconfigurable fixturing assembly of claim 1 wherein said support member has a length, and wherein said length is fixed.

6. The reconfigurable fixturing assembly of claim 1 wherein said support member comprises a distal end and a head connected to said distal end.

7. The reconfigurable fixturing assembly of claim 6 wherein said head is a vacuum head or an indexing head.

8. The reconfigurable fixturing assembly of claim 1 wherein said support assembly further comprises:
    a base, wherein said support member is connected to said base; and
    a translation assembly connected to said base.

9. The reconfigurable fixturing assembly of claim 8 wherein said translation assembly comprises a motor comprising a motor shaft operatively connected to said elongate member.

10. The reconfigurable fixturing assembly of claim 9 wherein said translation assembly further comprises a first gear connected to said motor shaft and a second, elongated gear connected to said elongate member, and wherein said first gear is engaged with said second gear.

11. The reconfigurable fixturing assembly of claim 1 wherein said sliding connection between said elongate member and said plurality of pivot assemblies is effected by a plurality of carriages slideably engaged with a guide rail.

12. The reconfigurable fixturing assembly of claim 11 wherein each carriage of said plurality of carriages is fixedly connected to an associated pivot assembly of said plurality of pivot assemblies, and wherein said guide rail is fixedly connected to said elongate member.

13. The reconfigurable fixturing assembly of claim 1 wherein said pivot axis is orthogonal to said longitudinal axis.

14. The reconfigurable fixturing assembly of claim 1 wherein each pivot assembly of said plurality of pivot assemblies comprises a first member pivotally connected to a second member by a pin.

15. The reconfigurable fixturing assembly of claim 1 wherein each pivot assembly of said plurality of pivot assemblies further comprises a thrust bearing positioned between said first member and said second member.

16. The reconfigurable fixturing assembly of claim 1 further comprising a plurality of carriages, wherein each carriage of said plurality of carriages is fixedly connected to an associated pivot assembly of said plurality of pivot assemblies, and wherein each carriage of said plurality of carriages is slideably engaged with an associated transverse guide rail of said plurality of transverse guide rails.

17. The reconfigurable fixturing assembly of claim 1 wherein said guide rail axis of each transverse guide rail of said plurality of transverse guide rails is substantially parallel with said guide rail axes of the other transverse guide rails of said plurality of transverse guide rails.

18. A reconfigurable fixturing system comprising a plurality of said reconfigurable fixturing assemblies of claim 1.

19. The reconfigurable fixturing system of claim 18 further comprising a workpiece supported by said plurality of said reconfigurable fixturing assemblies.

20. A method for fixturing a workpiece with a plurality of support assemblies, each support assembly of said plurality of support assemblies comprises a support member, said method comprising:
    connecting said plurality of support assemblies to an elongate member such that each support assembly of said plurality of support assemblies is slideable along a longitudinal axis of said elongate member;
    connecting said elongate member to a plurality of transverse guide rails by way of a plurality of pivot assemblies, wherein each transverse guide rail of said plurality of transverse guide rails defines a guide rail axis that is transverse to said longitudinal axis;
    moving said elongate member relative to said plurality of transverse guide rails to a desired orientation within an x-y plane;
    moving said plurality of support assemblies to desired positions along said elongate member;
    optionally, adjusting a length of each of said support members of said plurality of support assemblies; and positioning said workpiece on said support members of said plurality of support assemblies.

\* \* \* \* \*